Patented Dec. 19, 1950

2,534,926

UNITED STATES PATENT OFFICE 2,534,926

INSECTICIDE COMPRISING BENZENE HEXACHLORIDE AND TAR OILS

Newville F. Rea, Sumner, Wash.

No Drawing. Application June 23, 1947, Serial No. 756,555

4 Claims. (Cl. 167—29)

The present invention concerns an insecticide wherein, by combination of two recognized insecticides, results are obtained which are new in kind, and different from and better than any results obtainable with either one alone, or by the use of the two separately and uncombined.

The composition which constitutes the present invention grew out of attempts to realize the ideal insecticide, namely, one which when applied to the soil along plant rows is effective against soil-infesting insects, and one which, when applied directly upon the foliage of seedling plants, is nonphytotoxic, and, furthermore, an insecticide which is not only effective against soil-infesting insects, but which will also control aphis and the like which feed directly upon the foliage of the plants. It has been found that the resultant product not only meets this ideal in high degree, but in addition has various other advantageous properties. For instance, (a) it will not lose its effectiveness over long periods of time, and after periods approximately double the usual interval between sprayings it will still remain at least twice as effective against earth-infesting insects as the ingredient which is primarily and normally employed for that purpose; (b) it overcomes completely the disagreeable odor characteristic of one of the ingredients, and makes the combined product tolerable to the persons who must handle it; (c) it not only prevents injury to the individual plants, and diminution of the stand, which is characteristic of one ingredient in some cases, but actually stimulates germination and plant vigor; and (d) it makes soluble, hence readily handled and applied, an ingredient which otherwise is nearly insoluble. Such advantages will be discussed in greater detail hereinafter.

A product which long has been available commercially under the trade name "Carco" is extremely efficacious in combatting soil-infesting insects, such as cabbage maggots, carrot rust flies, strawberry root weevils, black vine weevils, and onion maggots. "Carco" contains a high percentage of tar acids and tar acid oils, which are coal tar distillants, or the lower fractions of heavy creosote oils resulting from the distillation of coal tar. These constituents contain phenol, which, while less than 5% (which permits "Carco" to be classified as nontoxic) is still adequate to afford a characteristic odor, which is not unpleasant to humans, but which is repellant to insects. However, "Carco," in the normal concentrations necessary for proper control of soil-infesting insects, has been considered as unsuited for spraying upon tender foliage, as to which it is phytotoxic. Hence its use has been confined to treatment of the soil, usually in advance of setting out seedlings, to repel the earth-inhabiting insects that would subsequently injure the seedlings. Moreover, some damage can result to the seedlings if "Carco," when subsequently applied to the ground, is permitted to fall upon the foliage. Such factors severely restrict its usefulness, yet it is, in concentrations of about 1:100, and in the strength hereinafter pointed out, used commonly as a control for soil-infesting insects. "Carco" is ordinarily supplied as a concentration of tar acids and tar acid oils made emulsible by a rosin soap, the usual formula being approximately (by weight) as follows:

|  | Percent |
|---|---|
| Tar acid and tar acid oils | 71–73 |
| Caustic soda | 2.7 |
| Rosin | 15.5 |
| Water | remainder |
|  | 100. |

For use "Carco" is ordinarily diluted with water in the strength of 1:100, though sometimes in as weak a concentration as 1:200, or as strong a concentration as 1:40. One gallon of 1:100 solution is ordinarily considered to be required for the treatment of 150 linear feet of plant row. It is used by spraying or pouring it upon the ground before (or sometimes after) the plants are set out, and serves to repel the soil-infesting insects which otherwise might attack the plants. In this concentration it is phytotoxic to tender foliage, yet if it be further diluted in order to lessen its phytotoxic effect, it loses by so much its effectiveness against the insects for the control of which it is primarily employed, that is, its immediate effectiveness is decreased, and its lasting properties over a period of time are decreased.

Benzene hexachloride, sometimes referred to under various names such as "Hexachloro cyclohexane," "666," and "Gammexane," is one of the recently produced chlorinated insecticides. It is used by adding it, in powdered or crystalline form, usually admixed with an inert extender such as talc, to the soil along plant rows, or by dusting it upon the plants. It is a slightly brownish crystalline mass, supplied commercially in the form of a cake which has to be ground or milled, and is practically insoluble in water. It owes its effectiveness to its gamma isomer content, and usually or desirably contains 10% of that isomer. It has a disagreeable and persistent musty odor, which makes it repellant to those who must come into close contact with it, and which tends to linger on the person and also upon the plants and products to which it has been applied. Its insolubility restricts its usefulness, and its odor makes it positively disagreeable to use.

I have discovered that when benzene hexachloride is added to "Carco" the otherwise insoluble benzene hexachloride becomes appreciably soluble in the "Carco," which will absorb up to about 6.5% of the total of benzene hexachloride. The combined solution now becomes soluble in water, which simplifies its handling and application. Moreover, and very importantly, the objectionable odor of the benzene hexachloride is completely masked by the odor of the "Carco." The phenolic odor of "Carco" is not disagreeable, but tends to suggest cleanliness. Moreover, and most important of all, the addition of only a small amount of benzene hexachloride (for convenience, usually 5% of the whole) to "Carco" renders the combined solution in the 1:200 concentration (half the concentration of "Carco" alone as usually employed) nonphytotoxic to the foliage of even such tender plants as colyeus, begonias, wandering jews, impatiens, fuchsias, cabbage, snapdragons, phlox, primroses, strawberries, marigolds, and tomatoes, yet the combined solution, in this low concentration, is even more effective in repelling soil-infesting insects, and in killing crawling and flying insects, such as aphis, than was either ingredient alone and uncombined with the other. Indeed, a much weaker concentration of the combined product, such as 1:400, will serve at least as effectively as a solution of "Carco" of the concentration of 1:100, and the effect of the combined solution, even at the weaker concentration, will last much longer than does the stronger solution of "Carco" alone. Whereas initially the effectiveness of "Carco" as compared to the combined solution is not widely different, the effectiveness of the combined solution persists at a high level, until after a few days, perhaps as much as a week, the effectiveness of the combined solution is double that of the "Carco" alone. Therefore a longer period may elapse between sprayings, and less spray material is needed, yet does a better job over a longer period of time. The resultant lowered cost of spraying is an important matter to the commercial gardener or florist.

Benzine hexachloride has been supplied heretofore as a crystalline mass or powder, and usually has been formulated by admixture of an extender, such as powdered talc. Because of its slight solubility, or practical insolubility, it has been applied largely in powdered form, and it is difficult to achieve a formulation of the benzene hexachloride with its extender such as will prove effective and yet avoid injury to the plants. It is not so much that the benzene hexachloride so formulated is phytotoxic, as that it produces unexpected and sometimes undesirable results upon the plants themselves. For instance, in a certain test, with benzene hexachloride applied to a row of carrots, the stand of carrots was greatly reduced and irregular, and while the remaining plants were somewhat stimulated, the stand as a whole was not a desirable one, and ran more to foliage than to root. In another instance broccoli treated with benzene hexachloride was found to have been injured in the stem at the ground line, and handling which ordinarily would not harm the plant caused the stem to snap off. It seemed brittle.

Contrasted with this, the combined solution has been found to have a stimulating effect when applied to the soils into which seedlings are set, and this effect is uniform and persistent, and apparently is without other harmful results.

The combined solution (and it is a true solution, and not a suspension, hence is readily handled, and requires no agitation) is prepared by heating 95 pounds (or in that proportion of the "Carco" to about 190° F. or above, but not as high as 212°, and to this heated "Carco" is added about 5 pounds of crystalline benzene hexachloride. When the latter is thoroughly dissolved the solution is cooled, and remains a stable solution. It is employed by diluting it, the usual dilution being 1:200, with water. This solution is sprayed or poured upon the ground along the plant rows, and can be used as a spray upon the seedling plants. Treatment at intervals not more frequently than once in ten or fourteen days has been found sufficient to afford good protection, for example to radishes against maggots. Tests are now under way of the combined product for control of the boll weevil in cotton plants, and of other plants against other insects.

A further advantage that has been discovered to reside in the use of the combined product is its delayed or persistent effect. After soil treatment on a potato plot, potatoes were planted in the same plot the following year. There had been no intervening treatment of the plot, nor subsequent treatment during growth of the plants, yet the plants growing in the plot were much more vigorous than plants in an adjoining plot which had been treated in the previous year with "Carco" alone, and were wholly free of pests. While it is not possible to say whether the difference arises from the repellent effect of the combined product, or from its growth-stimulating effect, it is clear that the difference arises from some residual effect, after nearly a year.

To sum up, the addition of benzene hexachloride to "Carco" overcomes the objectionable and persistent odor associated with benzene hexachloride, and makes it tolerable to persons handling it. The benzene hexachloride is made quite appreciably soluble in water by the addition to "Carco." The combined product then becomes effective either for treating the soil or for spraying upon the plants, or both. Its effect, in 1:200 solution, is comparable to "Carco" at 1:100. Initially, in thus comparable concentrations, it is somewhat more effective than either "Carco" or benzene hexachloride alone. The effect of the combined products, in whatever concentration used, lasts much longer, and becomes increasingly more effective, in ratio to the effectiveness of "Carco" of comparable concentrations, as time goes on. As a result the interval between successive sprayings can be increased without undue loss of effectiveness, and the sprayings can be less heavy, and less of the product is necessary; therefore the cost of spraying is much less. Over and beyond these results there is a long-lasting tendency to stimulate plant growth, and to increase their vigor, and no tendency to injure tender foliage, or the plants themselves, so that the combined solution approaches the ideal of an insecticide to which plants are tolerant as a spray, and which can be used to impregnate the soil, thus affording protection to the plants, both against soil-infesting insects and against crawling and flying insects.

I claim as my invention:

1. An insecticide comprising an emulsible concentrate wherein tar acids and tar acid oils are present to the extent of approximately 72%, and the remainder consists essentially of emulsifying agents and water, in which concentrate has been combined approximately 5% additional of benzene hexachloride containing approximately 10% of the gamma isomer of benzene hexachloride.

2. An insecticide consisting essentially of an emulsible concentrate containing approximately 72% tar acids and tar acid oils and benzene hexachloride, containing approximately 10% of the gamma isomer of benzene hexachloride, up to about 6½% by weight of the whole, the remainder being said emulsible concentrate.

3. An insecticide comprising up to about 6½% by weight benzene hexachloride containing approximately 10% of the gamma isomer of benzene hexachloride and an emulsible concentrate, which concentrate comprises approximately, by weight:

| | Percent |
|---|---|
| Tar acids and tar acid oils | 71–73 |
| Caustic soda | 2.7 |
| Rosin | 15.5 |
| Water | Remainder |
| | 100.0 |

4. An insecticide comprising the constituents, in the approximate proportions, by weight, as follows:

| | Percent |
|---|---|
| Tar acids and tar acid oils | 69 |
| Caustic soda | 2.5 |
| Rosin | 15 |
| Benzene hexachloride containing approximately 10% of the gamma isomer of benzene hexachloride | 5 |
| Water | 8.5 |
| | 100.0 |

NEWVILLE F. REA.

REFERENCES CITED

The following references are of record in the file of this patent:

UNITED STATES PATENTS

| Number | Name | Date |
|---|---|---|
| 1,443,602 | Weber | Jan. 30, 1923 |

FOREIGN PATENTS

| Number | Country | Date |
|---|---|---|
| 19,552 | Australia | Dec. 12, 1935 |
| 576,493 | Great Britain | 1946 |